Figure 1:
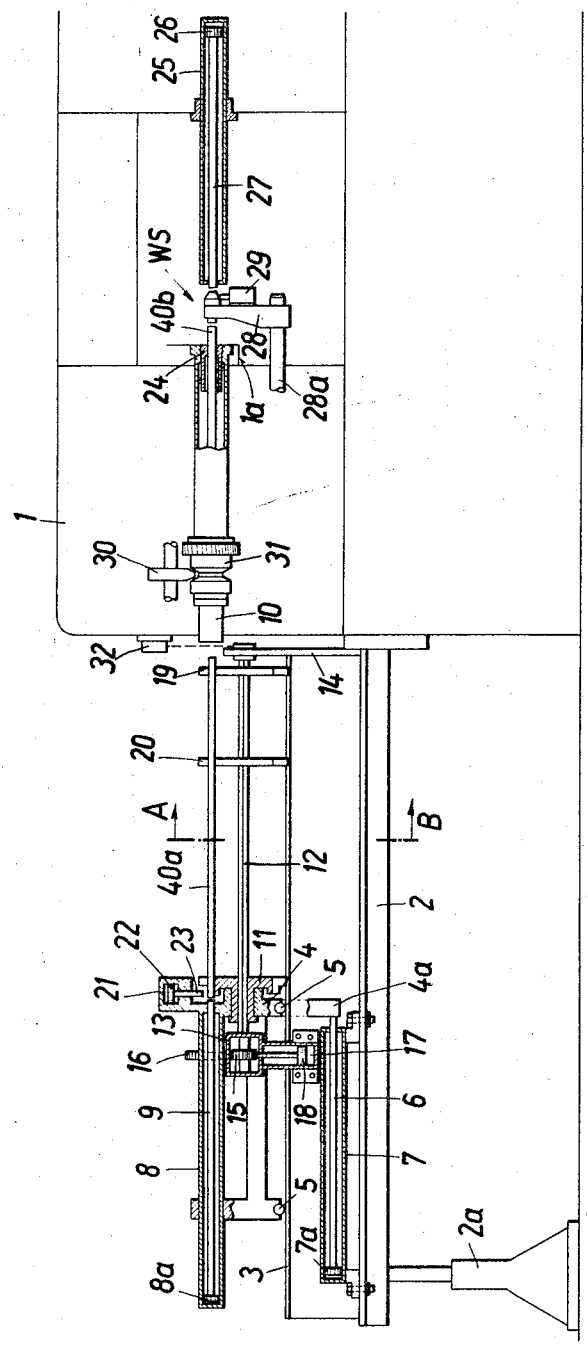

Inventor:
K.W. Kuckelsberg
By Michael S. Striker
his Attorney

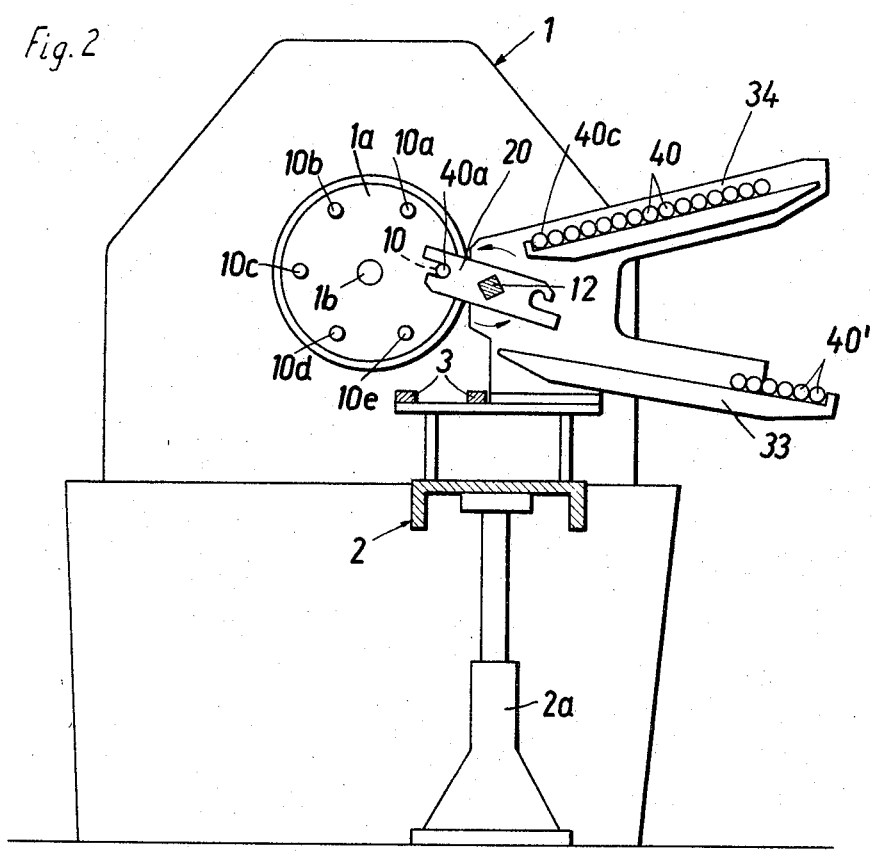

United States Patent Office 3,353,688
Patented Nov. 21, 1967

3,353,688
STOCK FEED MECHANISM
Karl Wilhelm Kuckelsberg, Babenhausen, Kreis Bielefeld, Germany, assignor to Werkzeugmaschinenfabrik Gildemeister and Comp., Akt.-Ges., Bielefeld, Germany
Filed Oct. 19, 1965, Ser. No. 497,995
Claims priority, application Germany, Oct. 20, 1964, W 37,794
15 Claims. (Cl. 214—1.3)

The present invention relates to stock feed mechanisms in general, and more particularly to improvements in a mechanism which can feed metallic bars or similar elongated workpieces to the spindles of a multiple-spindle automatic lathe or an analogous multiple-spindle machine. Still more particularly, the invention relates to a stock feed mechanism for a machine wherein each of a series of hollow spindles is provided with a chuck which is arranged to receive internally fed stock.

It is already known to provide a multiple-spindle automatic with a mechanism which is located at the back end of an indexible spindle holder and feeds elongated bar- or rod-shaped workpieces through the back ends of selected spindles. A finished workpiece is expelled by the next-following workpiece so that it issues from the front end of the corresponding spindle. A serious drawback of such mechanism is that the machine occupies too much space because there must be enough room for the longest workpiece at both axial ends of each spindle. Also, the machine can treat only relatively short workpieces because, as soon as the trailing end of a workpiece extends beyond the back end of the corresponding spindle, it prevents proper operation of the stock feed mechanism. Furthermore, such conventional mechanisms cannot be rapidly and conveniently converted for feeding workpieces of different lengths.

Accordingly, it is an important object of the present invention to provide a novel stock feed mechanism which avoids the drawbacks of the aforediscussed conventional mechanisms and which can be rapidly and conveniently converted for feeding elongated rod-shaped workpieces or similar stock of any desired length.

Another object of the invention is to provide a mechanism of the just outlined characteristics which can be readily combined with or incorporated in presently known multiple-spindle automatic machines, and wherein the fact that a portion of a workpiece might project beyond the back end of the corresponding spindle does not affect the operation of the mechanism.

A further object of the instant invention is to provide a multiple-spindle automatic machine which embodies a stock feed mechanism of the above outlined characteristics and wherein finished workpieces need not be ejected in a direction beyond the front ends of the spindles so that the space necessary for proper operation of the machine may be reduced to a considerable extent.

An additional object of the invention is to provide a stock feed mechanism wherein the transfer of a fresh workpiece into registry with a selected spindle automatically results in removal and deposition of the previously treated workpiece.

A further object of the invention is to provide a stock feed mechanism wherein all movable parts may be operated in accordance with a predetermined schedule so that the feed and removal of workpieces can take place without supervision.

Another object of the invention is to provide a stock feed mechanism which, in addition to being capable of properly aligning a fresh workpiece with the selected spindle, is also capable of moving the thus aligned workpiece to an optimum position with reference to the tools and of withdrawing a finished workpiece from such optimum position.

An ancillary object of the invention is to provide a method of feeding elongated pieces of raw stock to the spindles of a multiple-spindle automatic and of withdrawing finished pieces from such spindles.

Briefly stated, one feature of my present invention resides in the provision of a multiple-spindle machine comprising a holder in the form of a turret or drum which is indexible about a predetermined (preferably horizontal) axis, a working station provided at the front end of the holder, an annulus of hollow spindles mounted in the holder in such a way that the spindles are parallel with and equidistant from the axis of the holder and that one spindle registers with the working station during each interval between indexing movements of the holder, a magazine adjacent to the back end of the holder and located laterally of that spindle which registers with the working station, a supply of elongated pieces of stock in the magazine, and a novel stock feed mechanism which includes a frame adjacent to the back end of the holder. The stock feed mechanism further comprises elongated ways provided on the frame and extending in parallelism with the axis of the holder, a feed carriage reciprocable along the ways, a transfer unit mounted on the frame and comprising supporting means for withdrawing untreated workpieces seriatim from the magazine and for placing the thus withdrawn workpieces into registry with that spindle which registers with the working station, and shifting means provided on the carriage and comprising a reciprocable plunger coaxial with that spindle which registers with the working station. The plunger is arranged to advance a withdrawn workpiece through the momentarily aligned spindle so that the leading end of the workpiece extends to the working station where the workpiece may be treated by one or more tools.

In accordance with another feature of my invention, the transfer unit preferably comprises an elongated shaft which is rotatably mounted on the frame in parallelism with the axis of the holder and drive means for rotating the shaft. The aforementioned supporting means of the transfer unit may comprise a plurality of turning members or arms mounted on and turnable by the shaft, and the drive means is arranged to rotate the shaft through angles of such magnitude that a workpiece which has been withdrawn from the magazine by the transfer arms in a first angular position of the shaft is placed into registry with that spindle which registers with the working station in the next angular position of the shaft. One of the transfer arms is preferably coupled to and is reciprocable with the carriage, and at least one additional transfer arm is preferably adjustable in the longitudinal direction of the shaft. The carriage may be provided with a clamping device which can clamp a withdrawn workpiece to the one transfer arm so that such workpiece may be retracted from the corresponding spindle in response to movement of the carriage away from the holder.

The novel features which are considered as characteristic of the invention are set forth in particular in the appended claims. The improved stock feed mechanism itself, however, both as to its construction and its mode of operation, together with additional features and advantages thereof, will be best understood upon perusal of the following detailed description of a specific embodiment with reference to the accompanying drawings, in which:

FIG. 1 is a partly side elevational and partly sectional view of a multiple-spindle automatic machine which comprises a stock feed mechanism embodying my invention; and FIG. 2 is a transverse vertical section as seen in the direction of arrows from the line A–B of FIG. 1.

Referring now to the drawings in detail, there is shown a portion of a multiple-spindle automatic machine which comprises a stand 1 for a rotary spindle holder 1a. This spindle holder is indexible about the axis of a horizontal indexing shaft 1b and carries an annulus of six equidistant hollow work spindles 10–10e. The spindles 10–10e are equidistant from the axis of the indexing shaft 1b and rotate with the holder 1a which latter resembles a turret or drum and has a back end (shown in FIG. 2) and a front end adjacent to a working station WS shown in FIG. 1.

The improved stock feed mechanism is adjacent to the back end of the holder 1a and comprises a frame or base 2 one end of which is secured to the stand 1. The other end of the frame 2 is supported by a leg 2a. This frame carries elongated ways here shown as comprising at least two horizontal guide rails 3 which are parallel with the indexing shaft 1b. The rails 3 serve to support the wheels or rollers 5 of a feed carriage 4 which is shown in a fully retracted position. This carriage 4 is reciprocable by means of a fluid-operated motor which includes a double-acting horizontal cylinder 7 mounted on the base 2, a piston 7a which is reciprocable in the cylinder 7, and a piston rod 6 which is fixed to the piston 7a and to a downwardly extending portion 4a of the carriage 4.

The carriage supports a shifting device which includes a double-acting cylinder 8, a piston 8a which is reciprocable in the cylinder 8, and an elongated piston rod or plunger 9 which is fixed to the piston 8a and whose axis coincides with the axis of that hollow spindle 10 which happens to be in registry with the working station WS. FIG. 1 shows the plunger 9 in a fully retracted position.

The stock feed mechanism further comprises a transfer unit 13–20 which is mounted mainly on the frame 2 and serves to transfer elongated metallic or non-metallic workpieces 40 seriatim from a stock magazine 34 into registry with the plunger 9, i.e., into registry with the bore of that spindle whose front end is adjacent to the working station WS during an interval between successive indexing movements of the holder 1a about the axis of the shaft 1b. The transfer unit comprises a first transfer member or arm 11 which is coupled to but is rotatable with reference to the carriage 4 so that it may rotate about the axis of a horizontal shaft 12 of other than circular cross-sectional outline. In the illustrated embodiment, the cross-section of the shaft 12 resembles a square or a rectangle, and this shaft extends slidably through a complementary through bore in the transfer arm 11 so that the latter may share all reciprocatory movements of the carriage 4 but is compelled to share all angular movements of the shaft 12. The end portions of the shaft 12 are rotatable in a pair of longitudinally spaced bearing brackets 13, 14 which are mounted on the frame 2. The bracket 13 is hollow and accommodates certain components of a drive 15–18 which serves to rotate the shaft 12 in a given direction and always through angles of predetermined magnitude. The drive includes a pinion 15 which is mounted on the shaft 12 and is located in the interior of the bracket 13, a vertical rack 16 which meshes with the pinion, and a double-acting hydraulic or pneumatic motor which reciprocates the rack 16 with reference to the shaft 12 to thereby rotate the pinion 15. The motor which reciprocates the rack 16 comprises a vertical cylinder 17 which is mounted in the rear bearing bracket 13 and a piston 18 which is reciprocable in the cylinder 17 and is connected to the lower end portion of the rack 16. The motion transmitting connection between the pinion 15 and the shaft 12 comprises a one-way clutch (not shown) which serves to rotate the shaft when the pinion rotates in a counterclockwise direction, as viewed in FIG. 2, but allows the pinion to rotate with reference to the shaft 12 when the pinion is caused to rotate in a clockwise direction. The arrangement is such that the shaft 12 is rotatable through angles of 180 degrees.

The aforementioned transfer unit 13–20 further comprises two additional transfer members or arms 19, 20 at least one of which is shiftable in the longitudinal direction of the shaft 12 and each of which is formed with a bore which non-rotatably receives the adjoining portion of the shaft (see FIG. 2) so that the arms 19, 20 must share all angular movements of the arm 11 and shaft 12. The arms 19, 20 may be held in selected positions merely by friction or each thereof may be provided with a locking device (not shown) which can be moved into engagement with the shaft 12 to thereby fix the corresponding arm 19 or 20 at a desired distance from the back end of the holder 1a. At least one of the transfer arms 19, 20 is preferably held in a position close to the back end of the holder 1a.

The transfer arms 11, 19 and 20 are provided with bifurcated end portions (see FIG. 2) each of which may receive and hold a portion of an elongated workpiece 40. A supply of such workpieces is stored in the magazine 34 which is mounted on the stand 1 and/or on the frame 2 adjacent to the back end of the holder and laterally of that spindle 10 which happens to register with the working station WS. The stock 40 may travel in the magazine 34 by gravity feed, and this magazine is shown as being located at a level above a second magazine 33 which can accommodate a supply of finished or treated workpieces 40'. When the transfer arms 11, 19, 20 are caused to rotate through an angle of 180 degrees, one of their bifurcated end portions transfers a finished workpiece 40' into the second magazine 33 while the other bifurcated end portion withdraws a fresh workpiece 40 from the magazine 34 and moves the thus withdrawn workpiece into registry with the plunger 9 on the carriage 4.

The carriage 4 further supports a clamping device which serves to clamp or press a freshly finished workpiece against the transfer arm 11 in order to make sure that such workpiece will share movement of the carriage in a direction away from the holder 1a and to a position in which the freshly finished and withdrawn workpiece is ready to be delivered into the second magazine 33. The clamping device comprises a vertical double-acting cylinder 21 which is mounted on the carriage 4 at a level above the transfer arm 11, a piston 22 which is reciprocable in the cylinder 21, and a piston rod 23 which is fixed to the piston 22 and presses the trailing end of a finished and retracted workpiece against a suitable platform of the transfer arm 11 when the piston 22 is caused to perform a downward stroke in a direction toward the arm 11.

The front end of the holder 1a is adjacent to an ejector which serves to expel a freshly finished workpiece from that spindle which registers with the working station WS. The ejector comprises an elongated horizontal ejector rod 27 which may be introduced into or withdrawn from the bore of the registering spindle by means of a hydraulic or pneumatic motor including a horizontal double-acting cylinder 25 and a piston 26 which is attached to the rear end of the ejector rod 27. In FIG. 1, the rod 27 is shown in a fully retracted position so that the space between the front end of the holder 1a and the adjoining end of the cylinder 25 may accommodate a rockable stock stop 28 which is mounted on a rocking shaft 28a. The stop 28 carries an electric switch 29 which may effect opening and closing of the chuck 24 in that spindle which registers with the working station. The means for opening and closing the chuck 24 comprises a sleeve 31 and an actuating member 30 which can change the position of the sleeve 31 to thereby move the jaws of the chuck 24 to open or closed position. The exact construction of the parts 28–31 by itself forms no part of my present invention. The switch 29 may be closed by the leading end of that workpiece which has been introduced through the corresponding spindle and extends to the working station WS. When a workpiece trips the switch 29, the member 30 receives an impulse and causes the sleeve 31 to close the chuck 24 so that the workpiece is properly held during treatment by one or more tools which are mounted at or which can be moved to operative position at the working station WS.

The operation of the stock feed mechanism is as follows:

When the leading end of a workpiece 40b is being treated at or in the region of the station WS, the carriage 4 is held in its foremost position, i.e., adjacent to the back end of the holder 1a. The plunger 9 is maintained in the fully retracted position shown in FIG. 1, and the clamping device 21–23 is inactive, i.e., the piston 22 keeps the piston rod 23 in an upper end position. The stock stop 28 is moved away from the station WS so that it does not extend into the space between the ejector rod 27 and the workpiece 40b. The workpiece 40b may be treated in the angular position of FIG. 1 or in any other angular position of the holder 1a. However, when the treatment is completed, the holder 1a is indexed to such position that the axis of the freshly finished workpiece 40b coincides with the axis of the ejector rod 27. The actuating member 30 then receives an impulse to move the sleeve 31 to a position in which the chuck 24 is open so that the workpiece 40b can be shifted in the axial direction of the spindle 10.

In the next step, the right-hand chamber of the cylinder 25 is connected to a source of pressure fluid (not shown) so that the piston 26 causes the rod 27 to shift the workpiece 40b axially and onto the transfer arms 11, 19 and 20 until the trailing end of the workpiece 40b abuts against the forward end of the plunger 9. The upper chamber of the clamping cylinder 21 then receives a supply of pressure fluid so that the piston 22 moves downwardly and causes the piston rod 23 to press the trailing end of the workpiece 40b against the rearmost transfer arm 11. In a further step, the right-hand chamber of the cylinder 7 also receives a supply of pressure fluid so that the piston 7a moves toward the position shown in FIG. 1 and the piston rod 6 entrains the carriage 4 in the same direction. The workpiece 40b shares such movement of the carriage 4 because the clamping device 21–23 is operative and ultimately assumes the position 40a in which its leading end is fully withdrawn from the corresponding spindle 10 so that the holder 1a may be indexed to a different angular position in order to move the next spindle into registry with the working station WS. The rod 27 of the ejector 25–27 may be retracted to the idle position of FIG. 1 while the piston rod 6 retracts the carriage 4 to the rear end position. As soon as the carriage assumes such rear end position (which is actually shown in FIG. 1), the piston rod 23 of the clamping device releases the workpiece 40b (in the position 40a) and the cylinder 17 receives a supply of pressure fluid to shift the rack 16 whereby the rack rotates the shaft 12 through the intermediary of the pinion 15 so that the shaft 12 turns through an angle of 180 degrees. The direction in which the shaft 12 rotates is indicated in FIG. 2 by arrows. Such angular movement of the shaft 12 causes the transfer arms 11, 19 and 20 to deposit the freshly finished workpiece 40b on the second magazine 33 and to simultaneously withdraw the next workpiece 40c from the magazine 34. The workpiece 40c is then aligned with that spindle which has been indexed into registry with the working station WS, and such movement of the workpiece 40c is completed when the shaft 12 rotates through 180 degrees. The carriage 4 then performs a movement in a direction toward the back end of the holder 1a and moves the workpiece 40c into the bore of that spindle which registers with the working station ES. In the next step, the plunger 9 is caused to perform a forward stroke and to shift the workpiece 40c with reference to the carriage 4 (and with reference to the transfer arms 11, 19, and 20) until the leading end of the workpiece 40c extends beyond the front end of the corresponding spindle and trips the switch 29 of the stop 28 which, in the meantime, has been returned to the position of FIG. 1. The function of the stop 28 is to arrest the workpiece 40c in optimum axial position for treatment by one or more tools. The switch 29 causes the sleeve 31 on the corresponding spindle to close the chuck 24 so that the workpiece 40c is properly clamped and is ready for treatment.

The stop 28 is then moved away from the working station WS and the plunger 9 is retracted to the position shown in FIG. 1 but the carriage 4 remains in its right-hand end position, i.e., adjacent to the back end of the holder 1a. This completes a full cycle and the next cycle will begin as soon as the treatment of the workpiece 40c is completed.

The machine of my invention may further comprise a control device which sends impulses to start the rack 16 at the time when a freshly finished workpiece is fully removed from the corresponding spindle. In the illustrated embodiment, the control device includes a photoelectric cell 32 which is mounted on the stand 1 adjacent to the back end of the holder 1a and which allows the piston 18 to perform a working stroke only if the leading end of the workpiece 40b (in the position 40a) cannot interfere with indexing movements of the holder. All of the aforedescribed steps may be regulated by a suitable programming device which includes the cell 32 and insures that the movements of the holder 1a, carriage 4, shaft 12, plunger 9, stop 28 and ejector rod 27 may take place in a predetermined sequence.

An important function of the ejector rod 27 is that it can move a rather short workpiece into the range of the clamping device 21–23. For example, a workpiece might be so short that, when its leading end extends beyond the front end of the corresponding spindle, its trailing end does not project beyond the back end of such spindle. In the absence of the rod 27, such short workpiece could not be readily retracted to such an extent that its trailing end would enter the space between the rearmost transfer arm 11 and the piston rod 23.

The length of strokes of the carriage 4 and plunger 9 is selected in such a way that the improved mechanism can readily feed relatively short or relatively long workpieces.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the following claims.

What is claimed as new and desired to be protected by Letters Patent is.

1. In a machine of the character described, a holder indexible about a predetermined axis and having a back end and a front end; a working station provided at the front end of said holder; an annulus of hollow spindles mounted in said holder, said spindles being equidistant from said axis and one thereof being in registry with said station during each interval between indexing movements of said holder; a magazine adjacent to the back end of said holder and located laterally of said one spindle, said magazine being arranged to accommodate a supply of elongated pieces of stock; and a stock feed mechanism including a frame adjacent to the back end of said holder, elongated ways provided on said frame and extending in parallelism with said one spindle, a feed carriage reciprocable along said ways, a transfer unit mounted on said frame and comprising supporting means for withdrawing pieces of stock seriatim from said magazine and for placing the thus withdrawn pieces into registry with said one spindle, and shifting means provided on said carriage and comprising a reciprocable plunger coaxial with said one spindle and arranged to advance a withdrawn piece of stock through said one spindle so that the leading end of the stock extends to said station.

2. A structure as set forth in claim 1, further comprising motor means for reciprocating said carriage along said ways.

3. A structure as set forth in claim 2, wherein said transfer unit further comprises an elongated shaft rotatably mounted on said frame in parallelism with said one spindle and drive means for rotating said shaft, said supporting means comprising a plurality of transfer members mounted on and rotatable with said shaft, said drive means being arranged to rotate said shaft through angles of such magnitude that a piece of stock which was withdrawn from said magazine by said transfer members in a first angular position is placed into registry with said one spindle in the next angular position of said shaft.

4. A structure as set forth in claim 3, wherein at least one of said transfer members is movable longitudinally of said shaft.

5. A structure as set forth in claim 3, wherein one of said transfer members is coupled to and is reciprocable with said carriage.

6. A structure as set forth in claim 5, further comprising clamping means provided on said carriage and arranged to clamp the withdrawn piece of stock to said one transfer member so that such piece of stock may be retracted from said one spindle in response to movement of said carriage away from said holder.

7. A structure as set forth in claim 6, further comprising a second magazine arranged to receive retracted pieces of stock from said transfer members in response to each angular movement of said shaft.

8. A structure as set forth in claim 6, wherein said clamping means comprises a cylinder mounted on said carriage, a piston received in said cylinder and movable in directions toward and away from said one transfer member, and a piston rod fixed to said piston and arranged to press the withdrawn piece of stock against said one transfer member when said piston is moved toward said one transfer member.

9. A structure as set forth in claim 1, further comprising ejector means adjacent to the front end of said holder, said ejector means comprising an elongated ejector rod coaxial with said one spindle and motor means for reciprocating said rod so that, on movement of said rod into said one spindle, a piece of stock may be shifted axially and back onto said supporting means until the trailing end of such piece abuts against said plunger.

10. A structure as set forth in claim 9, wherein said motor means comprises a double-acting cylinder and a piston reciprocably received in said cylinder, said rod being fixed to said piston.

11. A structure as set forth in claim 1, wherein said holder is indexible about a horizontal axis and wherein said ways comprise a plurality of parallel horizontal rails, and further comprising motor means mounted on said frame for reciprocating said carriage, said motor means comprising a double-acting cylinder fixed to said frame, a piston reciprocable in said cylinder, and a piston rod fixed to said piston and to said carriage.

12. A structure as set forth in claim 1, wherein said transfer unit comprises an elongated shaft parallel with said axis and rotatably mounted in said frame, and drive means for rotating said shaft through identical angles including a pin secured to said shaft, a rack meshing with said pinion, and a motor mounted on said frame and arranged to move said rack with reference to said shaft to thereby rotate said pinion.

13. In a multiple-spindle machine tool, a holder indexible about a predetermined axis and comprising a plurality of equidistant hollow spindles parallel with said axis, one of said spindles being located in a predetermined angular position between indexing movements of said holder; a magazine adjacent to one end of said holder and arranged to accommodate a supply of elongated workpieces; an ejector located at the other end of said holder and comprising a rod extendable into said one spindle; and a feed mechanism including a carriage reciprocable in parallelism with said spindles at said one end of the holder, a plunger reciprocable on said carriage and extendable into said one spindle, and transfer means comprising a plurality of transfer members movable between a plurality of angular positions in one of which they withdraw a work-piece from said magazine and in another of which the thus withdrawn workpiece is placed between said one spindle and said plunger in the retracted position of said carriage so that the workpiece may be introduced into said one spindle in response to movement of said plunger with or without reference to said carriage.

14. A structure as set forth in claim 13, wherein said transfer members are rotatable about a second axis which is parallel with the axis of said holder and wherein at least one of said transfer members is adjustable in the longitudinal direction of said second axis.

15. A structure as set forth in claim 13, further comprising clamping means for detachably connecting to said carriage a workpiece which registers with said one spindle so that such workpiece may be withdrawn from said one spindle in response to movement of said carriage away from said one end of said holder.

References Cited
UNITED STATES PATENTS

| | | | |
|---|---|---|---|
| 2,108,274 | 2/1938 | Tautz et al. | 214—1.5 |
| 2,618,842 | 11/1952 | Gridley | 214—1.5 |

GERALD M. FORLENZA, *Primary Examiner.*

F. E. WERNER, *Assistant Examiner.*